United States Patent [19]

Newburg

[11] 4,250,927
[45] Feb. 17, 1981

[54] DUCT SPACER CLIP AND DUCT ASSEMBLY

[75] Inventor: Arthur G. Newburg, Dover, Fla.

[73] Assignee: Piper Aircraft Corporation, Greenwich, Conn.

[21] Appl. No.: 69,475

[22] Filed: Aug. 24, 1979

[51] Int. Cl.³ .................. F16L 9/18; A44B 21/00
[52] U.S. Cl. .................................... 138/113; 24/3 J; 24/255 SL; 138/114; 248/560; 285/133 R; 403/372
[58] Field of Search .............. 138/113, 114, 90, 149; 403/372; 285/133 R; 24/255 R, 255 SL, 3 J; 248/560

[56] References Cited

U.S. PATENT DOCUMENTS

| 2,297,146 | 9/1942 | Guirl | 138/113 |
| 2,875,987 | 3/1959 | Valley | 138/114 |
| 2,962,053 | 11/1960 | Epstein | 138/113 |
| 3,126,918 | 3/1964 | Eaton | 138/113 |
| 4,014,369 | 3/1977 | Kobres | 138/113 |
| 4,033,381 | 7/1977 | Newman et al. | 138/113 |

Primary Examiner—Steven L. Stephan
Attorney, Agent, or Firm—Patrick J. Walsh

[57] ABSTRACT

Disclosed is a clip for spacing concentric ducts or tubes one from the other. The clip includes an elongated strip of sheet metal bent medially of its length to define a first apex and a pair of segments symmetrical on opposite sides of a plane. Each segment includes a first segment portion extending away from the apex and plane, a second segment portion extending toward the plane and defining with the first segment portion a second apex, and a semicircular flange at its end. The clip is disposed between the concentric inner and outer tubes forming the duct assembly at spaced axial positions therealong. The apices and flanges engage the outer tube and the segment portions engage the inner tube. The clip serves to minimize heat transfer between the tubes, and accommodate thermal expansion and contraction of one tube relative to the other while maintaining concentricity and providing substantially unimpeded flow through the annular space between the tubes.

11 Claims, 6 Drawing Figures

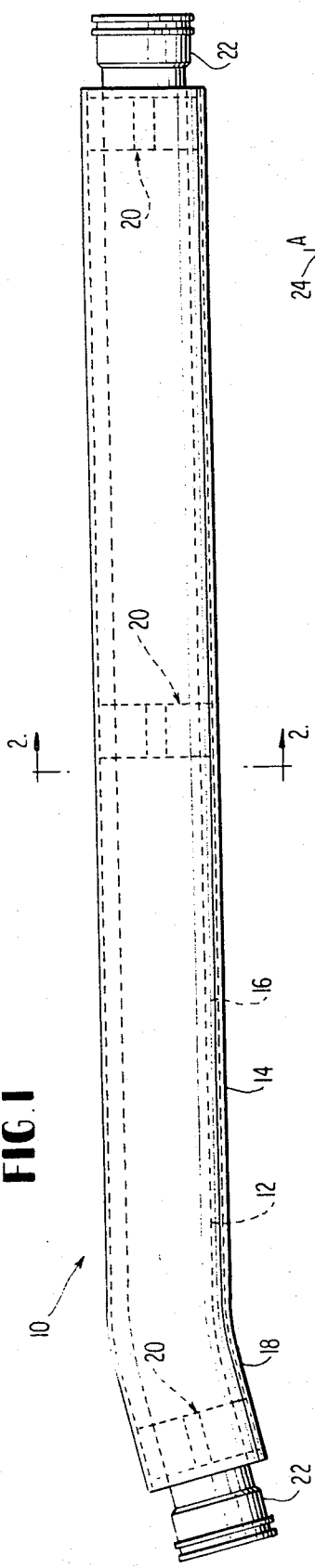
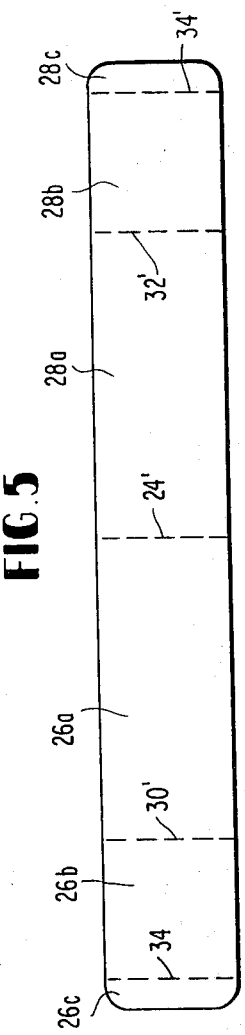
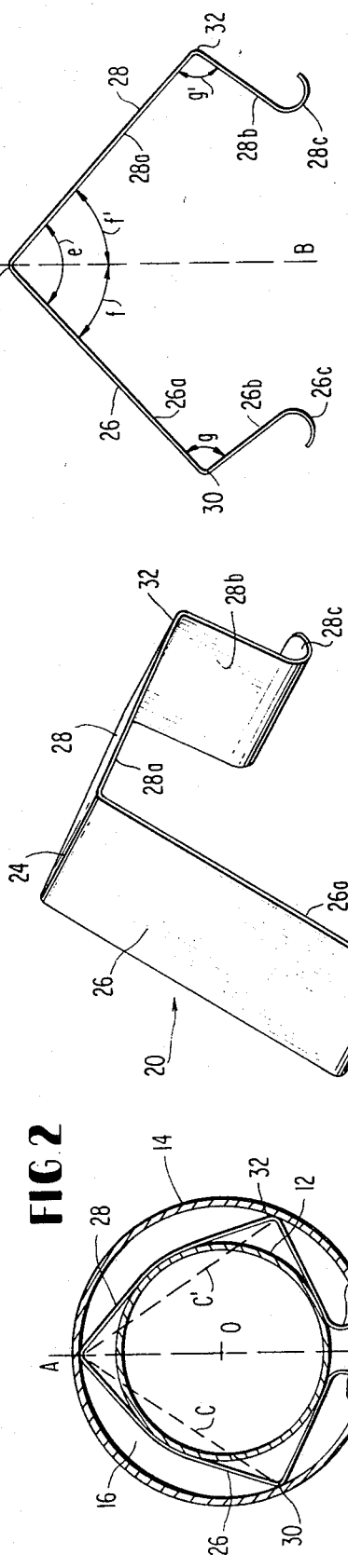
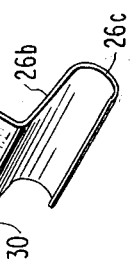
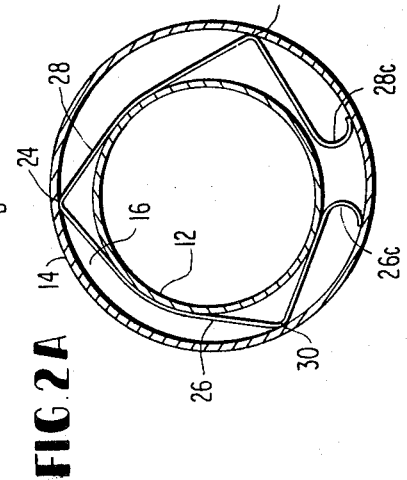

DUCT SPACER CLIP AND DUCT ASSEMBLY

BACKGROUND OF THE INVENTION

The present invention relates to a clip for spacing ducts one from the other and to a duct assembly including the spacer clip. More particularly, the present invention relates to a clip disposable between a pair of inner and outer tubes or ducts for spacing and maintaining substantial concentricity of the tubes one with respect to the other and to the tube assembly utilizing such spacer clips.

In the design of ducts utilized for flowing fluids, for example concentric ducts utilized in aircraft for flowing air at different temperatures, there are often stringent requirements. Such requirements include avoidance of heat transfer from one duct to the other or to its surrounding support and ancillary parts and accommodation for thermal expansion and/or twisting of the ducts or tubes relative to one another. Further, in concentric ducts or tubes of this type wherein fluid at one temperature flows through an inner tube and fluid at a higher or lower temperature flows through the annular space between the inner and outer tubes, the support structure for the inner tube must not substantially impede the flow of fluid through the annular space between the tubes. Thus, it is important, in addition to the foregoing requirements, that any clip designed to space the concentric tubes one from the other present a minimum frontal area to the fluid flowing in the annular space between the tubes. Still further, in the aircraft environment, it is desirable to minimize the weight of the spacers or clips used to space the ducts or tubes one from the other.

Many designs for flowing fluid at different temperatures through concentric or near concentric fluid passages have been proposed and constructed in the past. U.S. Pat. Nos. 4,033,381, 3,782,452, 4,014,369, 2,962,053, 3,126,918, and 2,875,987 are representative of such proposals and constructions. However, each of these fails to meet one or more of the above-noted requirements, e.g., permits substantial heat transfer between the concentric ducts, cannot accommodate expansion or contraction of the ducts relative to one another, or impedes the flow of air through the space between the inner and outer tubes by reason of the support structures necessary to interconnect and space the tubes.

BRIEF DESCRIPTION OF THE PRESENT INVENTION

Accordingly, it is a primary object of the present invention to provide a novel and improved clip for maintaining the spacing between the inner and outer tubes of a duct assembly for flowing fluids.

It is also a primary object of the present invention to provide a novel and improved duct assembly for flowing fluids utilizing the aforementioned clip.

It is another object of the present invention to provide a novel and improved duct spacer clip for maintaining the concentricity of inner and outer tubes in a duct assembly utilized for flowing fluids at different temperatures through the inner tube and the annular space between the inner and the outer tubes, respectively.

It is a further object of the present invention to provide a novel and improved duct spacer clip for disposition between the inner and outer tubes of a duct assembly wherein heat transfer between the inner and outer tubes caused by the difference in temperatures of the fluids flowing through the inner tube and the annular space between the inner and outer tubes respectively is substantially eliminated or minimized.

It is a still further object of the present invention to provide a novel and improved duct spacer clip disposed between the inner and outer tubes of a duct assembly for maintaining the concentricity of the tubes without substantially impeding the flow of fluid in the annular space between the tubes.

It is a still further object of the present invention to provide a novel and improved duct spacer clip for disposition between the inner and outer tubes of a duct assembly which accommodates for thermal expansion and contraction of the tubes relative to one another while maintaining their concentricity and this irrespective of whether the higher temperature fluid flows through the inner tube or the annular space between the inner and the outer tubes.

It is a still further object of the present invention to provide a novel and improved duct assembly for flowing fluids which is relatively easy and simple to manufacture, is low in manufacturing and material cost, and may be readily assembled.

It is a related object of the present invention to provide a duct assembly for flowing fluids concentrically at different temperatures utilizing the aforementioned spacer clip and attaining the foregoing advantages and benefits.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing and other objects and in accordance with the purpose of the invention, as embodied and broadly described herein, a clip for spacing inner and outer tubes substantially concentrically one relative to the other constructed in accordance with the present invention comprises an elongated strip of resilient material formed substantially medially of its length to define a first apex and a pair of angularly related segments substantially symmetrical one to the other on opposite sides of a plane bisecting the angle formed between the segments, each of the segments including a first segment portion extending from the first apex in a direction away from the plane of symmetry and at an acute angle relative thereto, a second segment portion extending from the end of the first segment portion remote from the apex and in a direction toward the plane of symmetry to define with the first segment portion a second apex, and a third segment portion reversely formed adjacent the end of the second segment portion remote from the second apex to extend in a direction away from the plane of symmetry to define a bearing surface, the third segment portions being spaced one from the other on opposite sides of the plane of symmetry, whereby, upon resilient movement of the first, second and third segment portions on respective opposite sides of the plane of symmetry toward the plane of symmetry and disposition of the clip in the annular space between the inner and the outer tubes, the first and second apices and the bearing surfaces are adapted to resiliently bear against the outer tube and the first and second segment portions of each segment are adapted to resiliently bear against the inner tube. Preferably, the clip is formed of thin sheet metal whereby the strip can be readily bent to form the apices.

In another preferred form of the present invention, there is provided a duct assembly for fluid flow comprising an elongated inner tube defining a fluid flow passage, an elongated outer tube substantially concentrically about and spaced from the inner tube, the inner and the outer tubes defining an annular fluid flow passage therebetween, means for maintaining the tubes substantially concentric one to the other including a clip in the annular fluid flow passage between the inner and outer tubes, the clip including an elongated strip of resilient material formed substantially medially of its length to define a first apex engaged against the outer tube and a pair of angularly related segments substantially symmetrical one to the other on opposite sides of a plane bisecting the angle formed between the segments and containing the axes of the tubes, each of the segments including a first segment portion extending from the first apex in a direction away from the plane of symmetry and at an acute angle relative thereto, a second segment portion extending from the end of the first segment portion remote from the apex at an angle relative to the first segment portion and in a direction toward the plane of symmetry to define with the first segment portion a second apex engaged against the outer tube, and a third segment portion reversely formed adjacent the end of the second segment portion remote from the second apex to extend in a direction away from the plane of symmetry and defining a surface for bearing against the outer tube, the third segment portions being spaced one from the other on opposite sides of the plane of symmetry, each first segment portion engaging the inner tube intermediate its ends and each second segment portion bearing against the inner tube.

The accompanying drawings, which are incorporated in and constitute a part of the specification, illustrate one preferred embodiment of the invention and, together with the description, serve to explain the principles of the invention.

BRIEF DESCRIPTION OF THE DRAWINGS

FIG. 1 is a side elevational view of a novel and improved duct assembly constructed in accordance with the present invention.

FIG. 2 is an enlarged cross-sectional view thereof taken generally about on line 2—2 in FIG. 1 and illustrating a duct spacer clip constructed in accordance with the present invention for maintaining the spacing between the inner and outer tubes of the duct assembly;

FIG. 2A is a view similar to FIG. 2 illustrating the manner in which the duct spacer clip hereof biases the inner tube toward its normal coaxial position relative to the outer tube;

FIG. 3 is an enlarged perspective view of the duct spacer clip constructed in accordance with the present invention;

FIG. 4 is an end elevational view of the clip illustrated in FIG. 3 and showing the clip in a relaxed unbiased condition prior to disposition between the tubes; and FIG. 5 is a plan view of the duct spacer clip hereof prior to being formed to the configuration illustrated in FIGS. 3 and 4 and further illustrating the axes about which the clip is formed to obtain such configuration.

DESCRIPTION OF A PREFERRED EMBODIMENT

Reference will now be made in detail to the present preferred embodiment of the invention, an example of which is illustrated in the accompanying drawings.

Referring now to the drawings and particularly to FIG. 1, there is illustrated a duct assembly, constructed in accordance with the present invention, and generally indicated 10. Duct assembly 10 includes concentrically arranged elongated inner and outer tubes or ducts 12 and 14, respectively, defining an annular fluid flow passage 16 therebetween. Duct assembly 10 may extend linearly from end to end, may be curved, or may have one or more bends associated with it, for example as illustrated at 18 in FIG. 1. It is important to note, however, that inner and outer tubes 12 and 14, respectively, are coaxial or concentrically arranged relative to one another at each longitudinal location along the length of duct assembly 10 and are maintained in such coaxial or concentric relation by duct spacer clips, and generally designated 20, disposed in the annular space 16 between the inner and outer tubes. It will be appreciated that fluid, such as air, flows through both passages respectively defined by inner tube 12 and by the annular space 16 between the tubes, that such fluid may be at different temperatures and may flow in the same or different directions in the respective fluid flow passages, and that either of the fluid flow passages may be at the higher temperature with respect to the other flow passage. Fittings 22 are suitably secured, for example by welding, to the inner tube 12 at its respective opposite ends and it will be appreciated that similar fittings may likewise be attached to the opposite ends of outer tube 18 as necessary.

In accordance with the present invention, duct spacer clips 20 are particularly constructed to maintain the inner and outer tubes 12 and 14 respectively in concentric relation one to the other at each axial location along the length of duct assembly 10, substantially eliminate or minimize heat transfer between the tubes, and, simultaneously, provide for substantially unimpeded flow through the annular space 16 between the tubes. Duct spacer clips 20 also support one tube with respect to the other and it will be appreciated that clips 20 are spaced axially one from the other along the length of the duct assembly as needed and desired to maintain concentricity between the tubes.

Particularly, duct spacer clip 20 comprises a strip of resilient material, preferably metal, formed substantially medially of its length to define a first apex 24 and a pair of angularly related segments 26 and 28 substantially symmetrical one to the other on opposite sides of a plane indicated A-B in FIGS. 2 and 4 bisecting an angle e formed between segments 26 and 28. Plane A-B contains the axis O of duct assembly 10. Segment 26 includes a first segment portion 26a which extends from apex 24 in a direction away from the plane of symmetry A-B and at an acute angle f relative to plane A-B, a second segment portion 26b which extends from the end of first segment portion 26a remote from or opposite apex 24 in a direction toward the plane of symmetry A-B to define with first segment portion 26a a second apex 30 at an angle g therebetween, and a third segment portion 26c which is reversely formed adjacent the end of second segment portion 26b remote from or opposite apex 30 to extend in a direction away from the plane of symmetry A-B. Similarly, segment 28 includes a first segment portion 28a which extends from apex 24 in a direction away from the plane of symmetry A-B and at an acute angle f' relative to plane A-B, a second segment portion 28b which extends from the end of first segment portion 28a remote from or opposite apex 24 in a direction toward the plane of symmetry A-B to define with first segment portion 28a a second apex 32 at an angle g' therebetween, and a third segment portion 28c which is reversely formed adjacent the end of second segment portion 28b remote from or opposite apex 32 to extend in a direction away from the plane of symmetry A-B.

Preferably, duct spacer clip 20 is formed from a flat sheet metal blank, illustrated in FIG. 5, having a discrete length and width and which blank is formed or bent about axes 24', 30', and 32' to form respective apices 24, 30, and 32. Third segment portions 26c and 28c preferably comprise semicircular flanges terminating in tips lying on diameters passing through the axes 34 and 34', about which the respective third segment portions are formed or bent, and the juncture of the third segment portions with the second segment portions.

In a preferred embodiment of the present invention for use particularly with inner and outer tubes having diameters of 1.25 and 1.75 inches respectively, the blank illustrated in FIG. 5 may approximately 4.81 inches in length, 0.75 inches in width and be formed of sheet metal 0.007 inch thick. The blank is formed, e.g. bent, medially about axis 24' to form an angle e between segments 26 and 28 of about 97 degrees. First segment portions 26a and 28a preferably extend from apex 24 a distance approximately 1.55 inches at the end of which the segments are again formed, e.g. bent, to form second segment portions 26b and 28b. These latter segment portions extend inwardly toward the plane of symmetry A-B at angles g and g' relative to the respective first segment portions 26a and 28a, each of which is approximately 97 degrees. Each third segment portion 26b or 28b extends outwardly from its associated second segment portion 26a or 28a along a semicircular arc having a radius of about 0.10 inch. It will be appreciated that the duct spacer clip 20 hereof is illustrated in its unstressed or unbiased condition in FIG. 4, and is disposed in the annular space 16 between tubes 12 and 14 in a manner that will now be described.

In use, the segments 26 and 28 of clip 20 are displaced toward one another against their natural bias tending to maintain the segments in the spacing and configuration as illustrated in FIG. 4. Once the segments are displaced sufficiently toward one another, the clip may then be inserted into outer tube 14. The segments 26 and 28 then expand outwardly under their natural bias such that the apices 24, 30, and 32 engage the wall of outer tube 14. The tips or ends of third segments 26c and 28c also engage the wall of outer tube 14. Inner tube 12 may then be inserted within outer tube 14 and between the segments 26 and 28. Particularly, first segment portions 26a and 28a may be resiliently bent outwardly or away from one another by a suitable tool, not shown, thus enabling the inner tube 12 to be inserted within the clip. It will also be appreciated that duct spacer clip 20 may be first disposed about inner tube 12. Using a suitable tool, not shown, the second and third segment portions may then be disposed toward one another bending the first segment portions about the inner tube 12 and about clip 20. Once the clips are disposed in the annular space 16 between the inner and outer tubes, the clips may be displaced axially by a suitable tube not shown, along the concentric tubes until the clips 20 lie in the desired axial positions. It will be appreciated that as many clips as deemed necessary or desirous may be utilized and located at selected axial positions along the concentric tubes.

From a review of FIG. 2, it will also be appreciated that the segments 26 and 28 of each clip, when it lies in final position along the tubes, are biased for movement away from one another thus maintaining apices 24, 30, and 32 as well as the tips of the third segment portions engaged against the wall of outer tube 14. Further, the clips and the inner tube 12 are relatively sized such that, when each clip is in final positions between the tubes, the inner tube engages its first segment portions intermediate their ends and bends those segment portions outwardly, thus further biasing and maintaining apices 24, 30 and 42 in bearing engagement against the walls of the outer tube. That is, the inner tube 12 engages the first segment portions intermediate their ends and biases them outwardly such that a straight line extending between apex 24 and apex 30 or between apex 24 and apex 32 intersects the inner tube along a chordline thereof indicated C or C' as applicable in FIG. 2. Thus, the natural bias of each clip 20 is enhanced or supplemented by the bias effected on the clip by the engagement of the inner tube with the first segment portions. This assists to maintain each clip in its final position between the tubes as illustrated.

The natural bias of duct spacer clip 20 assists to maintain the concentricity of the tubes. For example, should the tubes shift radially one to the other as illustrated in FIG. 2A, the bias of the clips will exert forces on the tubes tending to return them to the desired coaxial or concentric arrangement thereof illustrated in FIG. 2. Also, the substantial width of the clip affords stability thereto when disposed between the tubes and thus precludes the clip from cocking or becoming skewed between the tubes.

From the foregoing, it will be appreciated that clips 20 space the tubes one from the other with minimum surface contact between the clips and the tubes. This substantially eliminates or minimizes the transfer of heat from one tube to the other. Further, because each clip is formed of very thin material and its thin dimension is oriented transverse to the direction of flow through the annular space 16 as illustrated, the flow through annular space 16 is substantially unimpeded. Still further, because each clip 20 is formed of a resilient flexible material and is not rigidly secured to either tube, it accommodates relative axial or twisting movement of the tubes, e.g. resulting from thermal expansion. Also, the clip is extremely lightweight, which is highly desirable in utilizing a concentric duct assembly of the type described in aircraft. It is also inexpensive to fabricate and apply to the tubes.

It will be apparent to those skilled in the art that various modifications and variations can be made in the duct spacer clips and concentric duct assembly of the present invention without departing from the scope or spirit of the invention.

What is claimed is:

1. A clip for spacing inner and outer tubes substantially concentrically one relative to the other, comprising:
    an elongated strip of resilient material formed substantially medially of its length to define a first apex and a pair of angularly related segments substantially symmetrical one to the other on opposite sides of a plane bisecting the angle formed between said segments, each of said segments including a first segment portion extending from said first apex in a direction away from said plane of symmetry and at an acute angle relative thereto, a second segment portion extending from the end of said first segment portion remote from said apex and in a direction toward said plane of symmetry to define with said first segment portion a second apex, and a third segment portion reversely formed adjacent the end of the second segment portion remote from said second apex to end in a direction away from said plane of symmetry to define a bearing surface, said third segment portions being spaced one from the other on opposite sides of said plane of symmetry, whereby, upon resilient movement of said first, second, and third segment portions on respective opposite sides of said plane of symmetry toward the plane of symmetry and disposition of said clip in the annular space between said inner and outer tubes, said first and second apices and said bearing surfaces are adapted to resiliently bear against the outer tube and the first and second segment portions of each segment are adapted to resiliently bear against the inner tube.

2. A clip according to claim 1 wherein said strip comprises a resilient plate having a discrete length and width and a thickness less than its width, said plane intersecting said plate along a line defining said first apex and extending the full width of said plate.

3. A clip according to claim 1 wherein each of said third segment portions comprises a semi-circular flange terminating in a tip intersected by a diameter extending through the center of the semicircular flange and the juncture of said second segment portion and said third segment portion.

4. A clip according to claim 1 wherein each of said first segment portions is flexible between said first apex and the corresponding second apex whereby said first segment portions are resiliently flexible in a direction outwardly of said plane of symmetry such that, when the clip is disposed between the tubes, a straight line between the first and second apices of each said first segment portions intersects the inner tube.

5. A clip according to claim 1 wherein said strip is comprised of sheet metal bent at said apices.

6. A duct assembly for fluid flow comprising:
an elongated inner tube defining a fluid flow passage,
an elongated outer tube substantially concentrically about and spaced from said inner tube, said inner and outer tubes defining an annular fluid flow passage therebetween,
means for maintaining said tubes substantially concentric one to the other including a clip disposed in said annular fluid flow passage between said inner and outer tubes, said clip including an elongated strip of resilient material formed substantially medially of its length to define a first apex engaged against said outer tube and a pair of angularly related segments substantially symmetrical one to the other on opposite sides of a plane bisecting the angle formed between said segments and containing the axes of said tubes, each of said segments including a first segment portion extending from said first apex in a direction away from said plane of symmetry and at an acute angle relative thereto, a second segment portion extending from the end of said first segment portion remote from said apex at an angle relative to said first segment portion and in a direction toward said plane of symmetry to define with said first segment portion a second apex engaged against said outer tube, and a third segment portion reversely formed adjacent the end of the second segment portion remote from said second apex to extend in a direction away from said plane of symmetry and defining a surface for bearing against said outer tube, said third segment portions being spaced one from the other on opposite sides of said plane of symmetry, each said first segment portion engaging said inner tube intermediate its ends and each said second segment portion bearing against said inner tube.

7. A duct assembly according to claim 6 wherein said first strip comprises a resilient metal plate having a discrete length and width and a thickness less than its width, said first and second apices and the bearing surfaces of said third segment portions defining substantially line contacts with said outer tube in the direction of the axes of said tubes to minimize heat transfer between said inner and outer tubes.

8. A duct assembly according to claim 6 wherein each of said second apices is located an angular distance greater than ninety degrees from said first apex along the arc of a circle having a center in said plane of symmetry and coincident with the axes of said tubes.

9. A duct assembly according to claim 6 wherein each said third segment portion comprises a semi-circular flange having a diameter substantially equal to the difference between the radii of said inner and outer tubes.

10. A duct assembly according to claim 6 wherein each said first segment portion is resiliently flexed outwardly intermediate its opposite ends by its engagement with said inner tube to bias said apices into engagement with said outer tube.

11. A duct assembly according to claim 10 wherein each said first segment portion is flexed outwardly such that a straight line between said first apex and its corresponding second apex intersects said inner tube along a chord thereof.

* * * * *